United States Patent
Van Wiemeersch et al.

(10) Patent No.: US 9,306,608 B2
(45) Date of Patent: Apr. 5, 2016

(54) METHOD AND APPARATUS FOR VEHICLE RADIO STATION PRIVACY MODE CONTROL

(71) Applicant: Ford Global Technologies, LLC, Dearborn, MI (US)

(72) Inventors: John Robert Van Wiemeersch, Novi, MI (US); Robert Bruce Kleve, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 14/071,722

(22) Filed: Nov. 5, 2013

(65) Prior Publication Data

US 2015/0126143 A1    May 7, 2015

(51) Int. Cl.
*H04W 4/02* (2009.01)
*H04H 20/53* (2008.01)
*H04B 1/16* (2006.01)
*H04B 1/08* (2006.01)

(52) U.S. Cl.
CPC . *H04B 1/16* (2013.01); *H04B 1/082* (2013.01)

(58) Field of Classification Search
USPC ............ 455/414.1, 420, 456.1, 456.3, 179.1, 455/185.1, 186.1, 186.2
See application file for complete search history.

(56) References Cited

U.S. PATENT DOCUMENTS

| | | | |
|---|---|---|---|
| 6,952,576 B2 | 10/2005 | Fish et al. | |
| 8,301,168 B2 | 10/2012 | Zubas et al. | |
| 2010/0138787 A1* | 6/2010 | Ciatti et al. | 715/810 |
| 2011/0207423 A1* | 8/2011 | Tarte | 455/186.1 |

FOREIGN PATENT DOCUMENTS

DE    102011002529 A1    7/2012

* cited by examiner

*Primary Examiner* — Blane J Jackson
(74) *Attorney, Agent, or Firm* — Jennifer M. Stec; Brooks Kushman P.C.

(57) ABSTRACT

A system includes a processor configured to receive a request to enable a privacy screen. The processor is further configured to receive a privacy screen engage trigger. Also, the processor is configured to change a current radio station to a predefined station, upon receipt of the engage trigger when a privacy screen is enabled.

13 Claims, 5 Drawing Sheets

METHOD AND APPARATUS FOR VEHICLE RADIO STATION PRIVACY MODE CONTROL

TECHNICAL FIELD

The illustrative embodiments generally relate to a method and apparatus for vehicle radio station privacy mode control.

BACKGROUND

Satellite subscription radio (Sirius/XM) offers a few dozen stations with adult content that is not suitable to be heard by children due to either the subject matter and/or the language. When passengers enter a parked vehicle before or along with the driver (ex., their spouse, children, work colleagues, boss, clients, friends, neighbors, etc.) the last station the driver had listened to from the previous drive cycle will come on and may allow unpredictable content or language to be audible. Further, some automotive OEMs, such as Ford, also allow the radio control head to operate without a key (for up to an hour or until battery charge is at risk) such that the radio can be turned on even without the key and/or present.

Additionally, even if the audio was or is turned down, the presets favorites on the radio display can visually show the listening preferences of the driver to passengers. Depending on the personality/life preferences of both the driver and the passengers, this may create an awkward and uncomfortable situation for the vehicle driver, potential embarrassment, and even potentially harm relationships such as those with clients, employers, or others that may not approve. Such situations can change relationships.

The same risks may also exist with less controversial subject matter such as a genre of music, political talk radio, NASCAR, religious programming, or other topics on which passengers may have opinions that could affect their relationship with the driver. The driver may wish to keep their personal life/interests private.

The same privacy principles could also apply to terrestrial radio stations and imported multimedia formats a driver may bring to the vehicle such as Cassettes, MP3 players, jump drives, CDs, SD cards, Bluetooth Streaming, WiFi streaming, and any method of playback. Concerned drivers could just shut down these media formats or radio bands when they leave the vehicle, but they may forget or did not expect to have passengers for the next drive cycle when they parked.

SUMMARY

In a first illustrative embodiment, a system includes a processor configured to receive a request to enable a privacy screen. The processor is further configured to receive a privacy screen engage trigger. Also, the processor is configured to change a current radio station to a predefined station, upon receipt of the engage trigger when a privacy screen is enabled.

In a second illustrative embodiment, a computer-implemented method includes receiving a request to enable a privacy screen. The method also includes receiving a privacy screen engage trigger. Further, the method includes changing a current radio station to a predefined station, via a computing system, upon receipt of the engage trigger when a privacy screen is enabled.

In a third illustrative embodiment, a non-transitory computer readable storage medium stores instructions that, when executed by a processor, cause the processor to perform a method including receiving a request to enable a privacy screen. The method also includes receiving a privacy screen engage trigger. Further, the method includes changing a current radio station to a predefined station, via a computing system, upon receipt of the engage trigger when a privacy screen is enabled.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
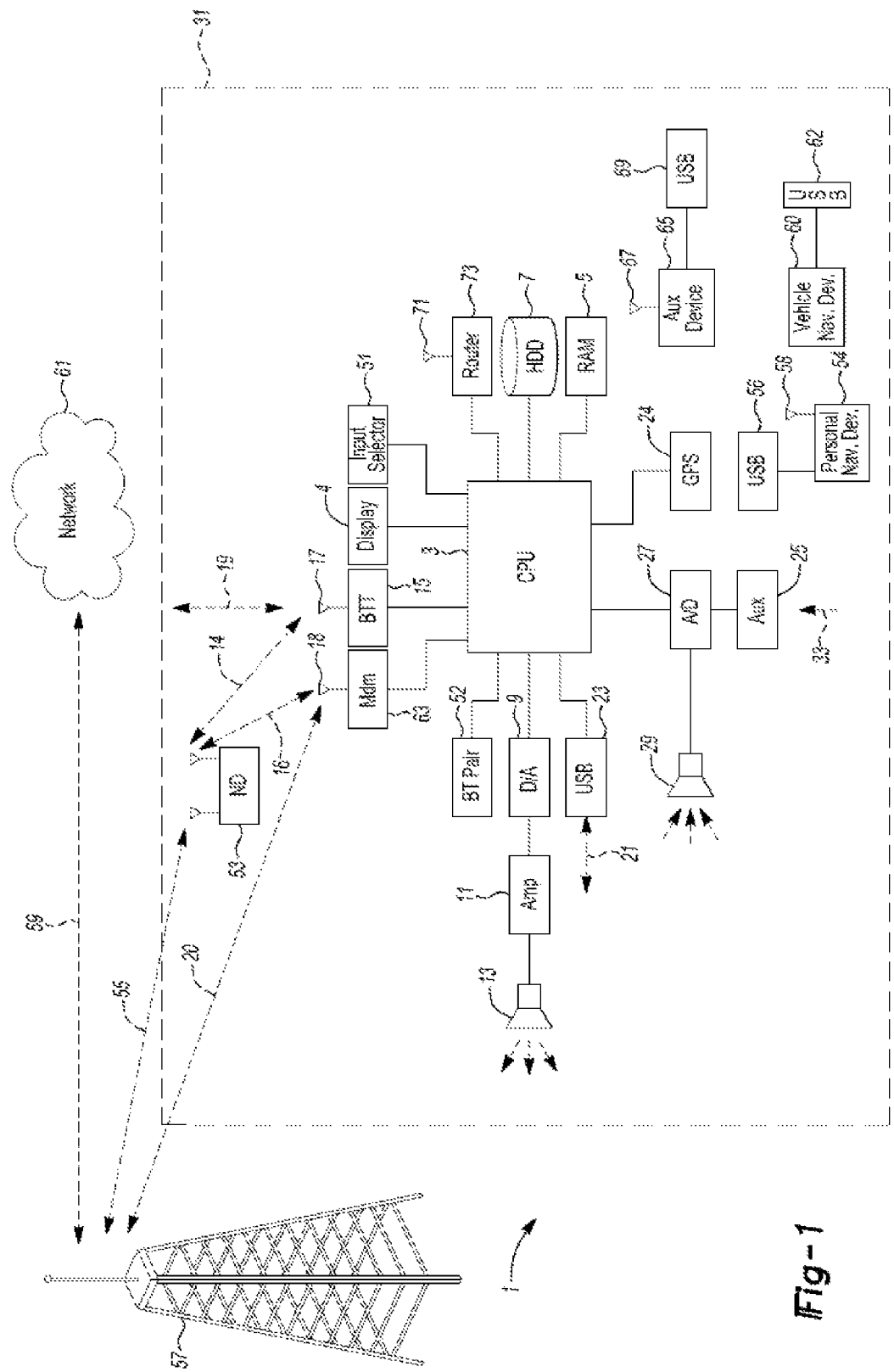
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication. In this example, link 16 may represent any LAN, which can support, for example, WiFi, WiMax and other non-cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids with Code Domain Multiple Access (CDMA), Time Domain Multiple Access (TDMA), or Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The illustrative embodiments provide a driver with a preference mode on the radio or other interface that allows selection of a privacy default mode (or similarly functioning, otherwise named mode). If the privacy default mode is enabled, at key-off events the audio system may behave in a preconfigured manner as defined by a driver during a configuration process.

For example, without limitation, the process may default to a local news or weather station, default to a certain music or other radio station, clear defined objectionable stations (e.g., without limitation, adult, political, religious, etc.) or perform other "sterilization" processes. For example, certain selections may only be available within defined geo-fence zones or outside of geo-fence zones.

Enablement of privacy mode can also be based on, for example, time of day, detected secondary occupant entry, location of vehicle, etc. Active privacy mode can also be indicated by discreet indicia, such as a color of radio buttons or other indicator, so that the enablement of privacy mode is not telegraphed to passengers. The system could also be triggered based on the presence or absence of an identified vehicle key used to start the vehicle and/or the presence or absence of another secondary key detected in the cabin, but not used to for starting, such as a wireless smart key assigned to a secondary driver other than the system administrator of the privacy mode. In another example, the presence of an unrecognized mobile device in the vehicle could trigger the privacy mode.

Figure 2:
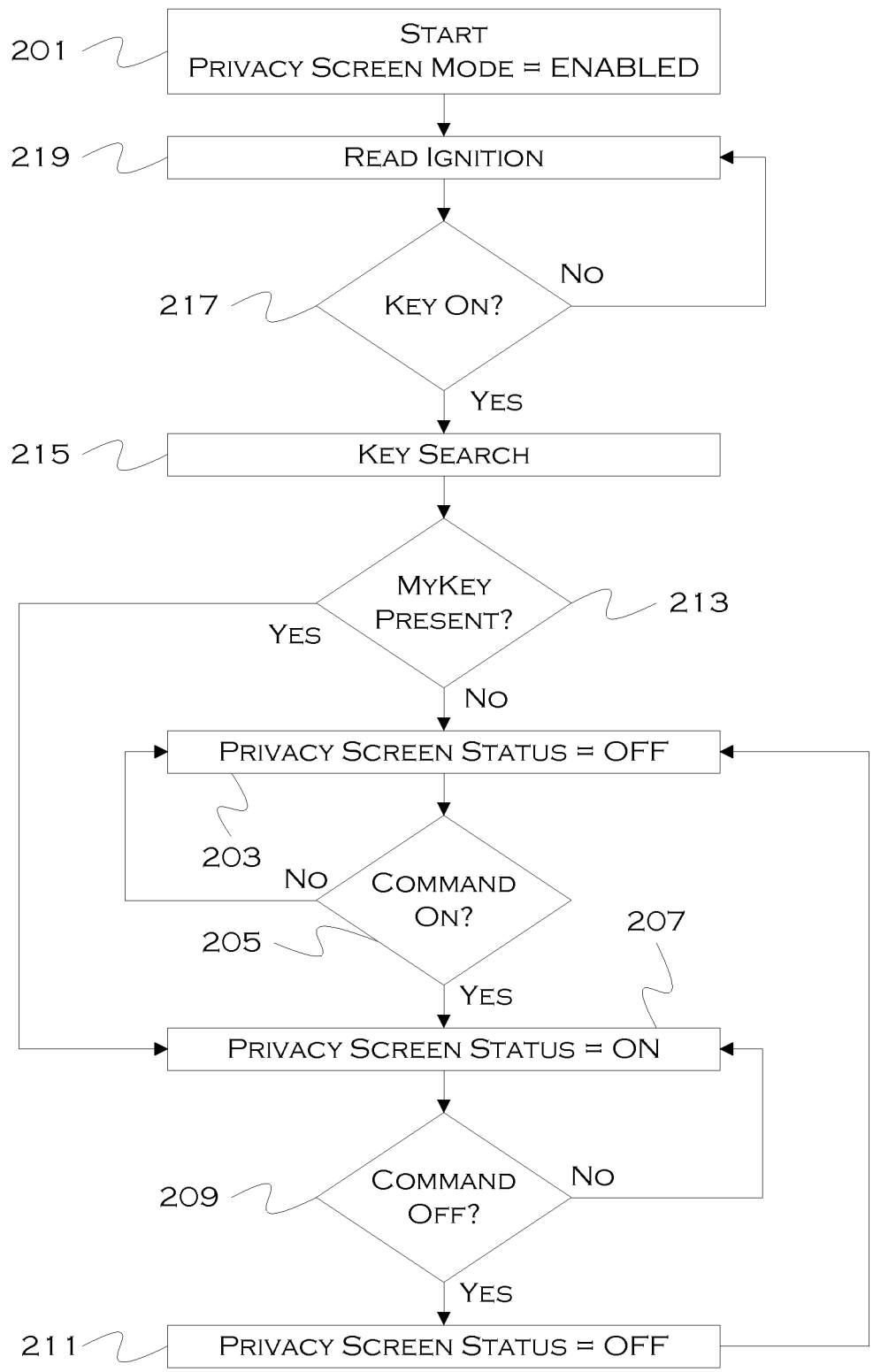
FIG. 2 shows an illustrative example of a privacy mode control process.

FIG. 2 shows an illustrative example of a privacy mode control process. In this illustrative example, the privacy screen mode is currently enabled in a vehicle 201, having been set and triggered prior to a previous key off. The process then reads an ignition state of the vehicle 219 (in this example, the vehicle was just entered by the driver). If the key is not yet on 217, the process will wait until a key-on state.

Once the key is on, the process will search for a specific identified vehicle key 213, such as a FORD MYKEY. This key identifies the driver and can be associated with a corresponding series of privacy settings that were previously configured by the driver. For example, a child may be provided with a certain key, so when the child is using the vehicle, the process may set the privacy default to "ON" 207. In this instance, once the screen is enabled, the screening process can occur immediately before waiting for a key-off event. In other instances, the presence of the key may automatically disable a screen, depending on who the key represents.

If there is not a "child" key in this case, the process will turn the privacy screen off 203. The screen remains off until a driver requests that the privacy screen be turned on 205. Similarly, once the screen is enabled, it may (during that drive-period, at least), remain enabled until a driver requests that the screen be turned off 209. At that point, the process will turn the screen off 211, which is how the screen will remain until enabled. Automatic events may also trigger or disable the screen, as will be discussed with respect to FIG. 4.

Figure 3:
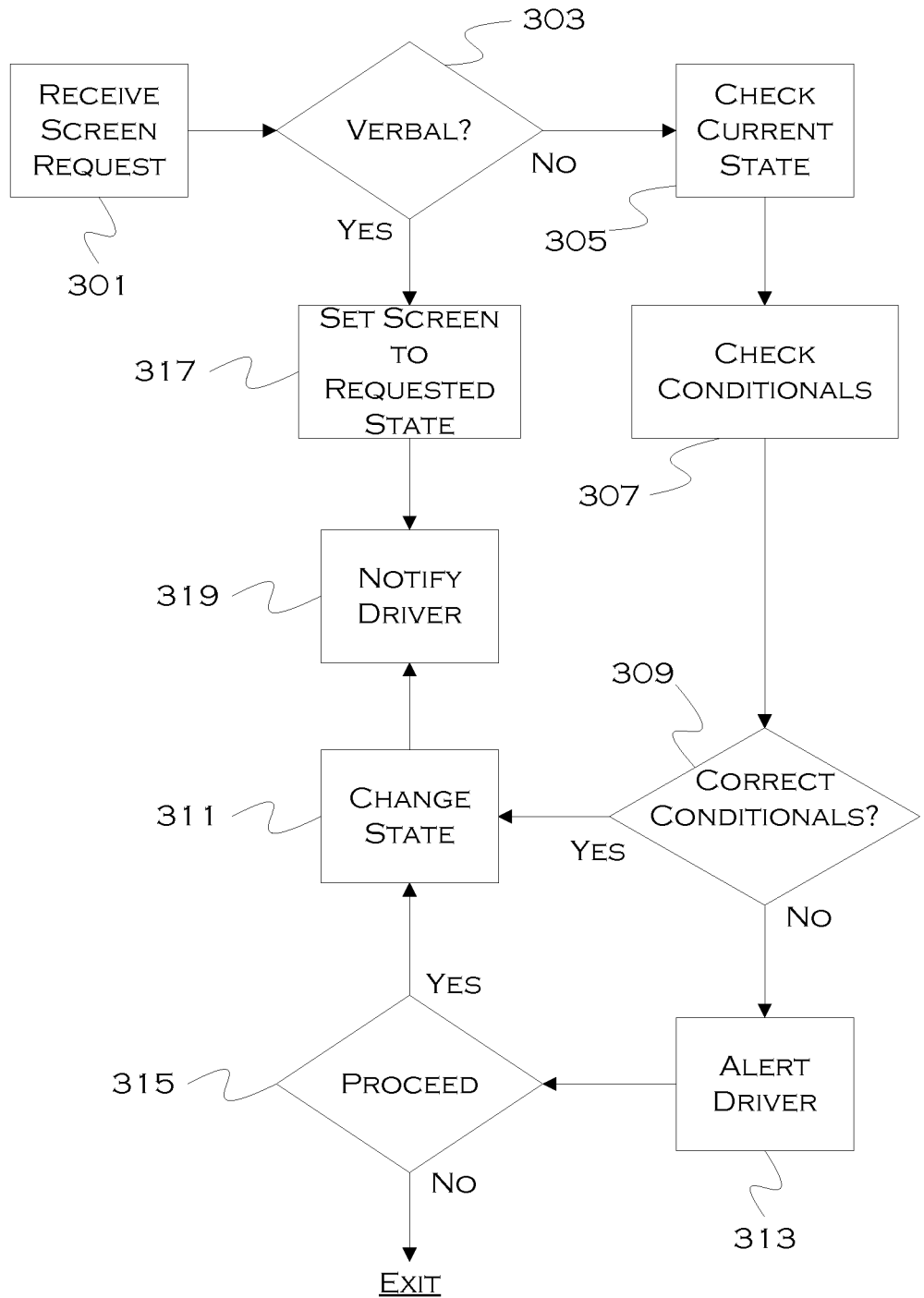
FIG. 3 shows an illustrative example of a privacy mode enablement request handling process.

FIG. 3 shows an illustrative example of a privacy mode enablement request handling process. In this illustrative embodiment, the process receives a request to enable the privacy screening 301. If the request is a verbal request 303, the process will set the screening to the desired state 317 and notify the driver of the setting 319. In this example, the process assumes that if the driver is verbally requesting the screen, the driver is not attempting to be discrete in the enablement of the screen. As such, verbal commands to disable the privacy mode may be allowed even if an unrecognized phone or secondary key has been detected in the cabin. Enablement of the screen can also, for example, give the driver an option to immediately change to the screened state, or to, for example, engage the screened state upon vehicle key-off or other suitable trigger.

If the request is non-verbal, it may have come from an automatic trigger or through a driver button press. First, the process checks to see if the screen is already enabled or disabled, based on the type of action requested 305. Additionally, in this example, the process checks to see if any associated conditionals for screening states are met 307.

For example, a driver may have preset a screen to always be enabled when an unknown device is present in a vehicle, or when the vehicle is located within predefined coordinates (e.g., at work). If the driver, for example, requests disabling of an active screen, the process may notice that an unidentified device is present in the vehicle, or that the vehicle is within "screen" coordinates. If the conditionals are such that a screen would typically be set 309, the process may alert the driver 313 before disabling the screen. If the driver still wishes to proceed, the screen may then be disabled.

In another example, screening may be automatically disabled whenever a restricted station is requested, via, for example, verbal or manual input. Once the user tunes or requests to tune to a restricted station, the system may assume that any privacy mode is no longer necessary, and thus will disable the privacy mode until a future conditional for enabling the privacy mode is met.

Similar steps may be taken for enabling a screen, with respect to conditionals under which a screen would typically be disabled. Again, if the driver consents, the process may change the screen state 311. This can be useful, because a driver may inadvertently request a state change, or may attempt to enable a screen, thinking that the screen is disabled, or vice versa.

Figure 4:
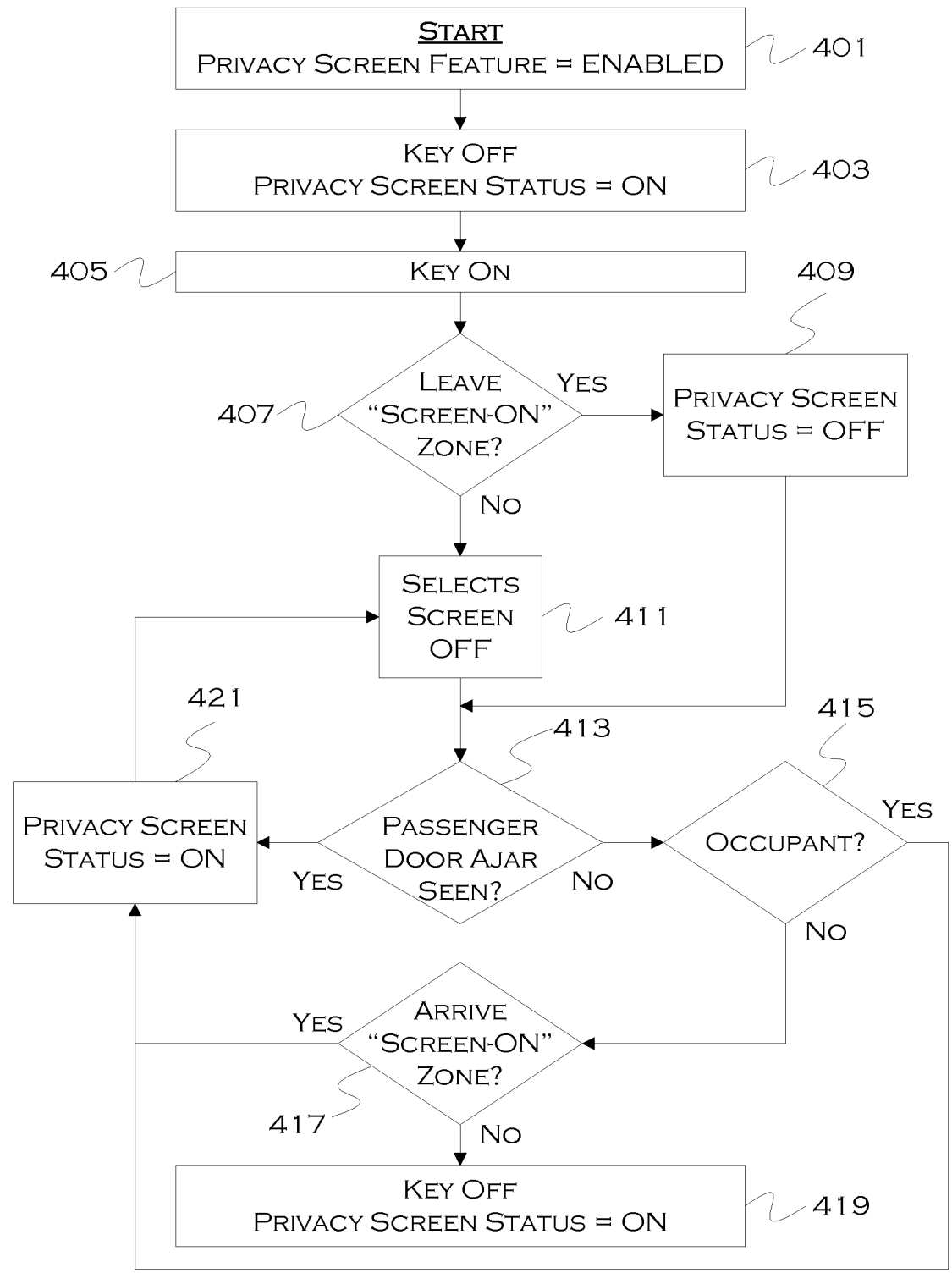
FIG. 4 shows an illustrative example of an automatically controlled privacy mode control process.

FIG. 4 shows an illustrative example of an automatically controlled privacy feature control process. In this illustrative example, the process assumes that the feature can be enabled and disabled in by the customer or the manufacturer. For example, the customer may use vehicle HMI to disable the feature if he finds it not valuable, or the manufacturer may configure it on and off at the dealer or plant. The process then begins with the privacy screen feature enabled, prior to a driver exiting a vehicle 401. Once the key is turned off 403, the process enables the privacy screen, taking actions such as those shown in example FIG. 5.

The process then sits dormant until a triggering state, such as, for example, a key on state 405. In this example, screening can be enabled/disabled when a vehicle is within certain zones. For example, to protect children, screening may be enabled while a vehicle is within a "home" zone. This helps ensure that young children are not exposed to undesirable content, such as raunchy comedy, for example. Other trigger states can also work in conjunction with a geo-fence, for example, passenger detection. If, for example, a secondary passenger is present, a privacy screen may remain enabled, even if the vehicle leaves the screen zone, until a driver explicitly disables the screen.

In this example, if the vehicle exits the "screening zone" 407, the privacy screen is disabled 409, so the driver can enjoy preselected listening stations. Or, if the vehicle is within the zone, and the driver selects a "Screen off," 411 the screen can be disabled.

While the screen is disabled, the process can check to see if a passenger door opens at any point 413. Typically, this will mean that an occupant will be entering the vehicle. Also, the process can check to see if any additional occupants are present 415, which may indicate the presence of those to be sheltered from typical listening preferences. If the door is opened, or if the occupant sensor detects secondary occupants, the screen may be enabled 421, until the driver explicitly disables the screen.

If there are no additional passengers or interruptions, the process may wait until a vehicle re-enters a "safe" zone 417. Once the safe zone is entered, the screening process is re-enabled, and the screen will be engaged upon key off 419. In this example, if the screen is disabled because the vehicle is traveling in a no-screen zone, and the vehicle moves into a screen zone, the screen will not be activated until a condition to trigger the screen (e.g., door open, key off, etc.) Occurs.

Figure 5:
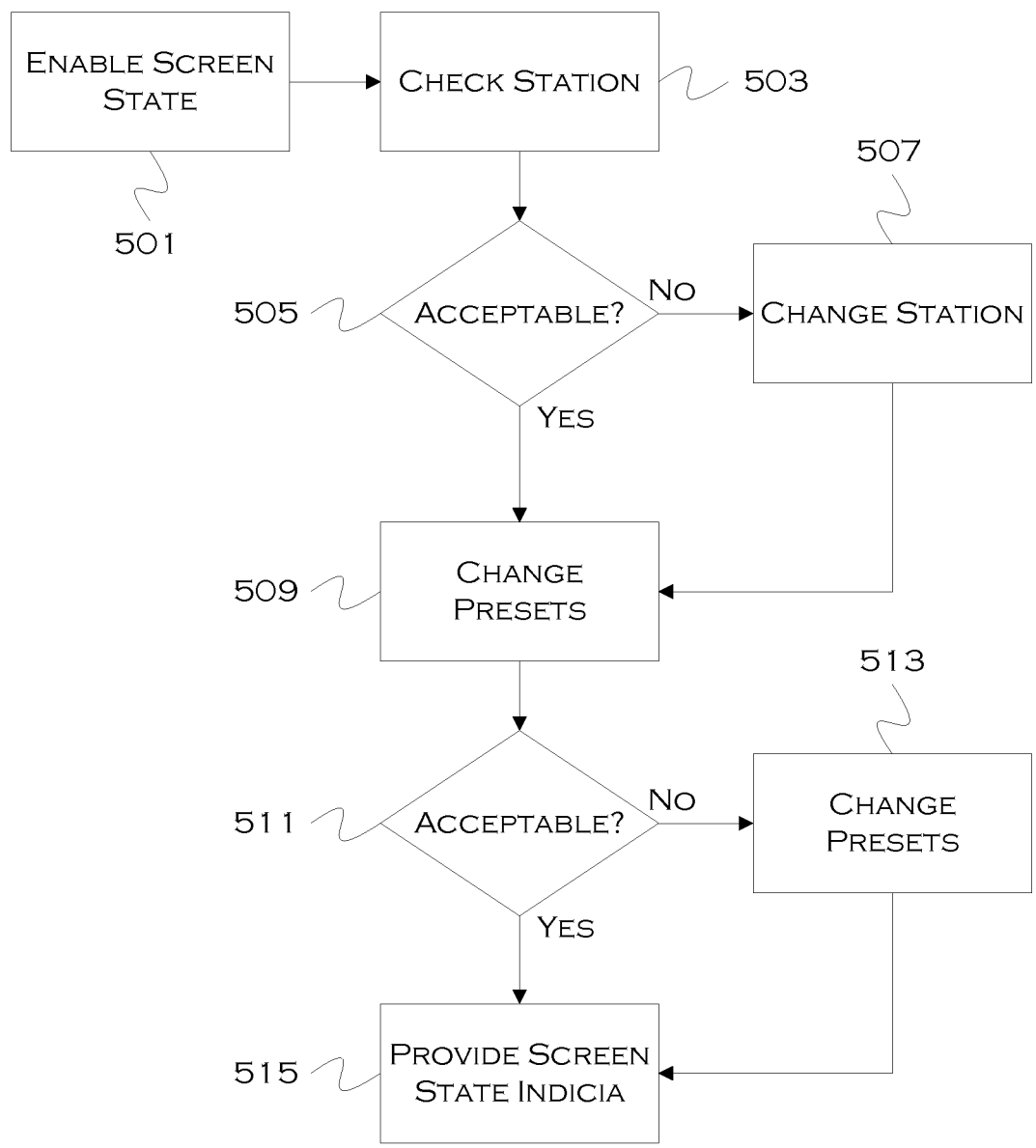
FIG. 5 shows an illustrative example of a privacy screening process.

FIG. 5 shows an illustrative example of a privacy screening process. In this illustrative example, the process receives instructions to activate a privacy screen state 501. Once the screen is activated, the process will "scrub" the vehicle entertainment system temporarily, in order to protect against undesirable content being delivered unintentionally. Media imported into the vehicle can undergo a similar scrubbing process, with meta data indicating song "ratings" and/or song titles being checked for improper words. Song names and/or artists can also be checked against a list of questionable content for additional protection, if desired.

In this example, the process checks to see the setting of a current radio station 503. If the radio station is not set to a "benign" station 505, the process can change the station to an acceptable preset station 507. Further, the process checks a list of visible preset stations 509.

If the visible preset correspond to "acceptable" presets 511, no changes may be made. Otherwise, the process will temporarily swap the presets to defined acceptable preset stations 513. Finally, in this example, the process provides a visual or other indicia of the privacy screen being enabled (which can help avoid driver confusion, for example, as to why the presets have changed, and can also alert the driver that the screen is enabled).

Since the user may set up personalized privacy settings, these settings can be imported to rental vehicles as well. The settings may be stored to the cloud, and, when appropriate, accessed by a rental vehicle equipped with a telematics unit capable of accessing the cloud. Then, in that vehicle, they could function in the same manner as they would in the user's personal vehicle. The settings could function based on, for example, the presence of a user's phone in the vehicle. (thus preventing them from being implemented for all future renters).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a request to enable a privacy screen based on a vehicle crossing a geo-fence into a predefined enablement zone;
receive a privacy screen engage trigger, including at least one of: detection of a non-driver vehicle occupant, detection of a non-driver door opening, and a vehicle key-off event;
change a current radio station to a predefined station, upon engage trigger receipt when a privacy screen is enabled.

2. The system of claim 1, wherein the processor is further configured to change a radio preset to a predefined preset, upon receipt of the engage trigger when a privacy screen is enabled.

3. The system of claim 2, wherein the processor is configured to receive a privacy screen disengage trigger and change at least one of a station or a preset to a previous state, changed when the engage trigger was received.

4. The system of claim 3, wherein the disengage trigger includes a driver manual input.

5. The system of claim 3, wherein the disengage trigger includes a vehicle crossing a predefined geo-fence into a disengagement zone.

6. The system of claim 5, wherein the processor is configured to disable the privacy screen when the vehicle crosses into the disengagement zone.

7. A computer-implemented method comprising:
receiving a request to enable a privacy screen based on a vehicle crossing a geo-fence into a predefined enablement zone;
receiving a privacy screen engage trigger, including at least one of: detection of a non-driver vehicle occupant, detection of a non-driver door opening, and a vehicle key-off event;
changing a current radio station to a predefined station, via a computing system, upon receipt of the engage trigger when a privacy screen is enabled.

8. The method of claim 7, wherein method further includes changing a radio preset to a predefined preset, upon receipt of the engage trigger when a privacy screen is enabled.

9. The method of claim 8, wherein the method further includes receiving a privacy screen disengage trigger and changing at least one of a station or a preset to a previous state, changed when the engage trigger was received.

10. The method of claim 9, wherein the disengage trigger includes a driver manual input.

11. The method of claim 9, wherein the disengage trigger includes a vehicle crossing a predefined geo-fence into a disengagement zone.

12. The method of claim 11, wherein the method further includes disabling the privacy screen when the vehicle crosses into the disengagement zone.

13. A non-transitory computer readable storage medium, storing instructions that, when executed by a processor, cause the processor to perform a method comprising:
receiving a request to enable a privacy screen, based on a vehicle crossing a geo-fence into a predefined enablement zone;
receiving a privacy screen engage trigger, including at least one of: detection of a non-driver vehicle occupant, detection of a non-driver door opening, and a vehicle key-off event;
changing a current radio station to a predefined station, via a computing system, upon receipt of the engage trigger when a privacy screen is enabled.

* * * * *